United States Patent [19]

Fischer et al.

[11] Patent Number: 5,127,777
[45] Date of Patent: Jul. 7, 1992

[54] APPARATUS FOR MAKING A DRILLED HOLE WITH AN UNDERCUT

[75] Inventors: Artur Fischer, Waldachtal; Willi Haug, Freudenstadt-Musbach; Lind: Stefan, Waldachtal, all of Fed. Rep. of Germany

[73] Assignee: Artur Fischer GmbH & Co. KG., Waldachtal, Fed. Rep. of Germany

[21] Appl. No.: 784,254

[22] Filed: Oct. 29, 1991

[30] Foreign Application Priority Data

Nov. 8, 1990 [DE] Fed. Rep. of Germany ....... 4035490
Jun. 12, 1991 [DE] Fed. Rep. of Germany ....... 4119350

[51] Int. Cl.⁵ .............................................. B23C 3/00
[52] U.S. Cl. ........................................ 409/130; 82/1.2;
 408/88; 408/236; 409/143
[58] Field of Search .................. 408/21, 22, 24, 88,
 408/110, 111, 236, 237, 180; 82/1.2, 1.5;
 409/125, 130, 143, 179, 201

[56] References Cited
U.S. PATENT DOCUMENTS 2,823,591  2/1958  Craddock et al. ............. 409/201
2,969,000  1/1961  Groebecker ................... 409/179

Primary Examiner—Daniel W. Howell
Attorney, Agent, or Firm—Michael J. Striker

[57] ABSTRACT

The device for making a drilled hole with an undercut consists of a drilling machine and connected rotatable drilling tool, a supporting stand for the drilling machine having a holding device with a bearing bush secured in it, and a sleeve fixedly joined to the drilling machine. The sleeve is rotatably mounted in the bearing bush. A lever (35) is attached to the drilling machine (12), a cam plate (39,49) having a circumferential surface (40,60) is attached to the supporting stand (3) and a crank are provided for the lever. An end of the lever (35) remote from the drilling machine (12) is connected with the crank so that the lever can be pivoted and the drilling machine with the drilling tool swung out. The crank has at least one peg engagable on the circumferential face of the cam plate, the circumferentil face acting as a stop for the lever so that the lever can be rotated when the peg engages on the circumferential surface so that the end of the lever remote from the drilling machine describes a circle about a center line of the lever in a neutral position of the lever.

6 Claims, 2 Drawing Sheets

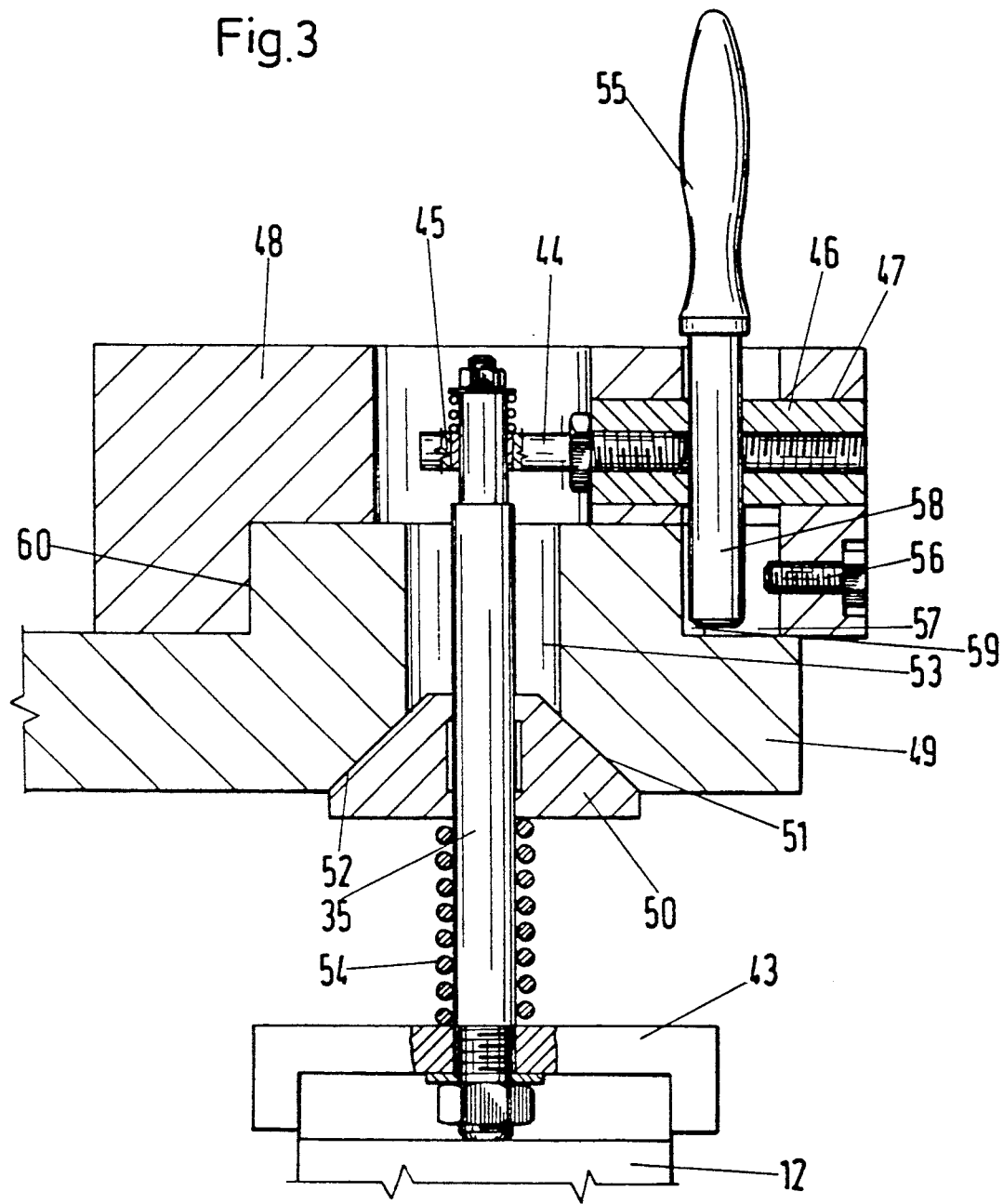

APPARATUS FOR MAKING A DRILLED HOLE WITH AN UNDERCUT

BACKGROUND OF THE INVENTION

The invention relates to an apparatus for making a drilled hole with an undercut, particularly in a facing panel.

A device for making a drilled hole with an undercut is known. This device consists of a drilling machine having a drilling tool received in an adapter joined to the drilling machine so as to transfer torque, a supporting stand for the drilling machine having a holding means, and a bearing bush secured in the holding means, in which bearing bush a sleeve fixedly joined to the drilling machine is received and mounted so as to rotate and swivel via a swivel bearing.

To produce a drilled hole with an undercut, a device is known which has a bearing bush provided with a concave depression in which a drilling tool provided with a collar is supported and mounted so as to swivel. By swivelling out the drilling tool while simultaneously performing a stirring movement, the lateral cutting edges arranged on the drilling tool ream out an under cut in the region of the bottom of the drilled hole, into which undercut an expansible plug with an expansible sleeve can be inserted with a matching fit.

A drilled hole of this type with an undercut can also be made in a facing panel or similar structure, but there the undercut must be made very exactly, so that, when an expansible anchor is inserted and expanded. The expansion pressure that is produced by the anchor should not be too great. Too great an expansion pressure can cause a part of the facing panel to break away. To produce an exact undercut, a drilling tool that has a drilling head provided with diamond chips is used. The known devices for producing drilled holes with undercuts are inadequate for these impact-sensitive and shock-sensitive drilled holes with undercuts in thin-walled facing panels.

SUMMARY OF THE INVENTION

It is an object of the present invention to provide a device for producing a drilled hole with an undercut, especially in a facing panel, which allows use of a drilled tool having diamond chips and allows an accurate drilled hole matched to the expansible plug to be produced by a positively guided swivelling-out action.

This object, and others which will be made more apparent hereinafter, are attained in a device for making a drilled hole with an undercut consisting of a drilling machine having a drilling tool received in an adapter joined to the drilling machine so as to transfer torque, a supporting stand for the drilling machine having a holding means, and a bearing bush secured in the holding means, in which bearing bush a sleeve fixedly joined to the drilling machine is received and mounted so as to rotate and swivel via a swivel bearing.

According to the invention, the device also comprises a lever attached to the drilling machine and a crank attached to lever. The device is structured so that the lever can be pivoted and the drilling machine with the drilling tool swung out. The crank has at least one peg engagable on a circumferential face of a cam plate attached to the supporting stand, this circumferential face acting as a stop for the pivoting of the lever. The lever secured to the drilling machine is swung out by the crank until at least one of the pegs mounted on the crank engages the circular circumferential face of the cam plate. Thus the lever can be moved so that its end remote from the end attached to the drilling tool describes a circle.

By the swivel bearing built into the device, the drill bit thus can be swung out away from its center line in a neutral position (or not swung-out position) of the drilling machine until the degree of undercut matched to the fixing element is achieved. By rotating the crank with its peg contacting the circumferential face of the cam plate, the lever is positively guided in its swung-out state with its end remote from that attached to the drilling machine describing a circle about its center line in its neutral position and, simultaneously with a rotary motion, the undercut is thus fully reamed out in the drilled hole. The possibilities of error, when reaming out the undercut as a result of an incomplete swinging-out action or an incomplete circular motion are unable to occur as a result of the positive guidance.

In one embodiment of the invention, the crank consists of a crank plate contacting the cam plate and advantageously a handle attached to the cam plate, the peg or pegs being attached to the cam plate. Advantageously the crank plate is provided with two pegs and the cam plate has a recess which is located to receive one of the pegs for locking the lever in the neutral position. The lever end remote from the drilling tool can be ball-like and engage in a bore of the crank plate so that the lever will not jam in the bore during operation.

Because of the recess on the circumferential face of the cam plate, the crank is able to interlock therewith so that, after one rotation, the lever is lockable again in its neutral position, in which the drilled hole is produced first before the swinging-out bevelled bore of the cam plate. To stabilize the neutral position a centering sleeve with a conical face can be arranged on the lever. The sleeve is pressed by a compression spring into the bevelled bore of the cam plate.

To prevent the crank lifting up during the swinging-out and rotating actions, the pegs arranged on the crank are provided with a member projecting at right angles, which engages the rear side of the cam plate.

In another embodiment of the invention, the crank consists of an annular plate positioned on the cam plate and a connecting rod connect to the lever and guided in a transverse bore of the annular plate. A handle can be attached to the connecting rod as desired.

BRIEF DESCRIPTION OF THE DRAWING

The objects, features and advantages of the present invention will now be illustrated in more detail by the following detailed description, reference being made to the accompanying drawing in which FIG. 3 is a detailed cross sectional view of another embodiment of a device for making a drilled hole with an undercut according to the invention showing the crank structure.

DETAILED DESCRIPTION OF THE INVENTION

Figure 1:
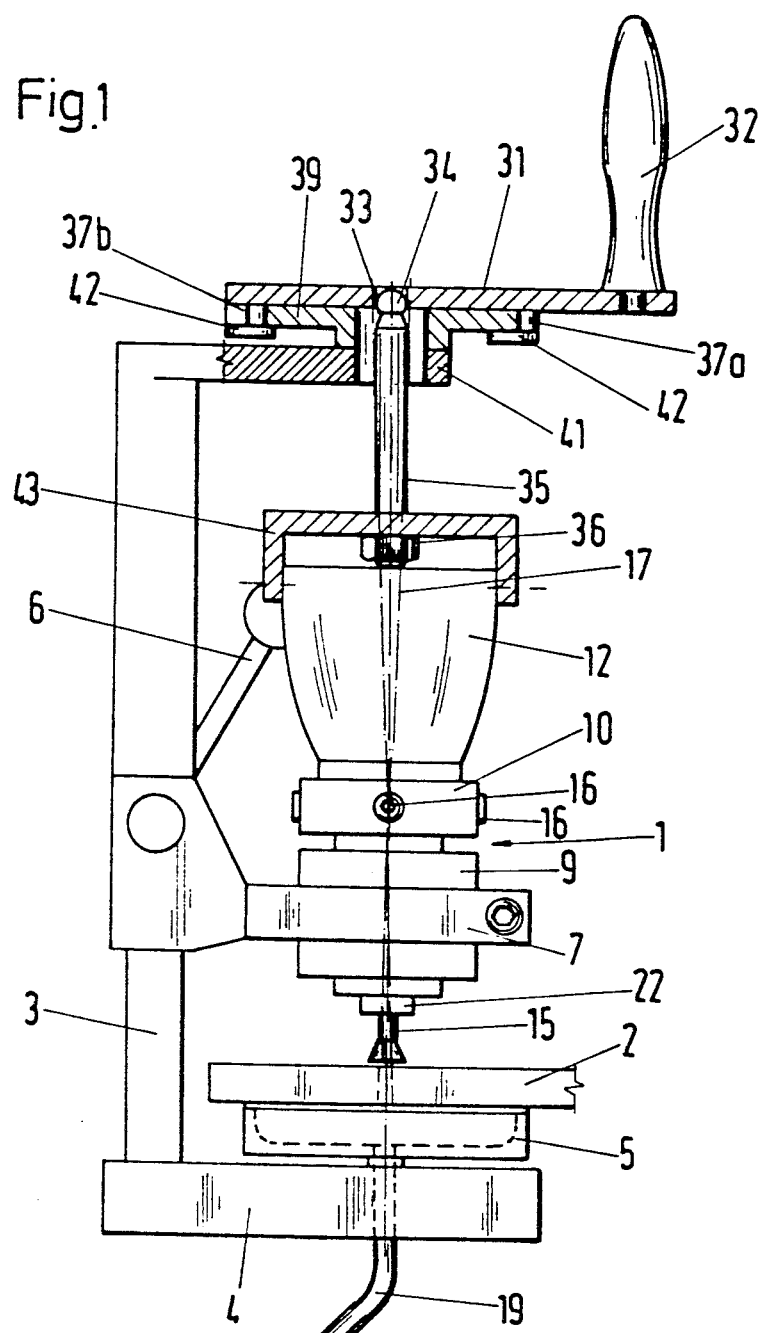
FIG. 1 is a partially side, partially cross sectional view of one embodiment of a device for making a drilled hole with an undercut according to the invention.

The device 1 for producing a drilled hole with an undercut in a facing panel 2 is integral with a supporting stand 3. One end of the supporting stand 3 has a base plate 4 with a clamping arrangement 5 for securely holding the facing panel 2. The other end of the supporting stand 4 has a pivotable arm 6, with which a holding means 7 attached to the stand 3, which receives the device 1 can be moved up and down. To retain the device 1 in the holding means 7, the holding means 7 has a slotted receiving bore in which a bearing bush 9 of device 1 is clamped by reducing the receiving bore. The bearing bush 9, in turn, receives a circumferential collar arranged on the sleeve 10, so that as the holding means 7 is moved up and down the entire drilling device 1 is moved with it.

The adapter 22 joined to the drilling machine 12 so as to transfer torque extends through the sleeve 10. At its end remote from the drilling machine the adapter 22 is provided with a drilling tool 15 required for making the drilled hole with an undercut. The sleeve 10 is rigidly joined to the housing of the drilling machine 12 by screws 16, so that, when the drilling machine 12 is pivoted out, the sleeve 10, and with it the drilling axis 17, is also swung out. A crank plate 31, which is provided with a handle 32, is used to swing out the drilling machine 12. The crank plate 31 has a cylindrical receiving bore 33 in which the ball-like end 34 of the lever 35 remote from the drilling machine is engaged. The lever 35 is fixed to the drilling machine 12 with a fixing flange 43 and a nut 35. The crank comprises the crank plate 31 and the handle 32 in the embodiment of FIG. 1.

Figure 2:
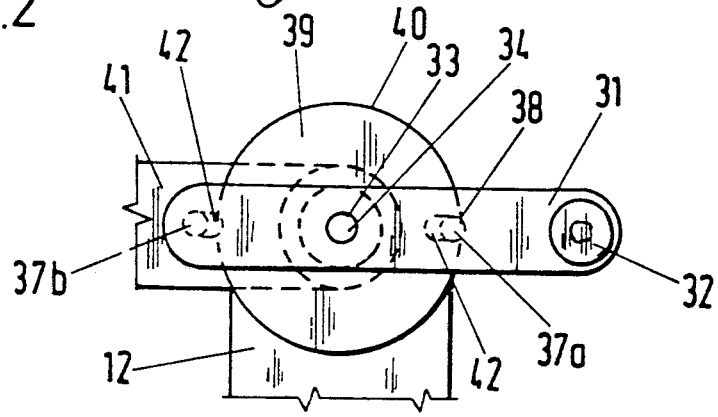
FIG. 2 is a plan view of the arrangement for positively-guided swivelling-out action.

In the neutral position of the lever 35 illustrated in FIGS. 1 and 2, the peg 37a mounted on the rear side of the crank plate 31 is located in a recess 38 of the cam plate 39. The peg 37a can be pulled out of the recess 38 with the crank plate or crank and at the same time rotated, advantageously using the handle 32, so that the peg 37a engages the circumferential face 40 of the cam plate 39. The lever 35 and the drilling machine 12 are thereby also swung or pivoted out, so that by virtue of the swivel bearing built into the device the drilling tool 15 likewise undergoes a swinging-out action in the opposite direction. This swinging-out is effected after the cylindrical drilled hole has been made in the facing panel. In its swung-out state the lever 35 is moved in a circle about its center line by rotation of the crank plate, and at the same time the undercut is reamed out in the facing panel using the drilling tool 15, which is also swung out.

At the end of one rotation, the peg 37a, which slides along the cam plate 39 on the circumferential face 40 thereof during the rotary motion, catches in the recess 38 again and thus brings the lever 35 into its neutral position. The device is now moved upwards by the lifting gear 6 so that the drilling tool 15 comes out of the drilled hole in the facing panel. The cam plate 39 is joined to the supporting stand of the device by a holding plate 41. For improved guidance of the crank plate 31 on the cam plate 39, opposite to the peg 37a the crank plate can be provided with a further peg 37b, which likewise engages the circumferential face 40 of the cam plate 39, after disengagement of the crank plate 31. To prevent the crank plate from lifting on the cam plate, the pegs 37a, 37b are provided with a member 42 projecting at right angles therefrom, which engages behind the rear side of the cam plate 39.

In another embodiment shown in FIG. 3, the crank is formed by a connecting rod 44, which is connected via a self-aligning bearing 45 to the lever 35. The connecting rod 44 is screwed into the sliding sleeve 46, which is guided in a transverse bore 47 of the annular plate 48. The annular plate 48 rests on the cam plate 49 and is rotatable relative thereto. This crank also can have a handle 55 in this embodiment.

To stabilize the neutral position, as illustrated in FIG. 3, of the lever 35 connected to the drilling machine 12 by the fixing flange 43, there is placed over the lever 35 a centering sleeve 50, which has a conical face 51. This conical face 51 engages the bevel 52 of the bore 53 of the cam plate 49 to center the lever. The suitable contact pressure is applied by a compression spring 54. In this position, the cylindrical drilled hole is produced by sinking the drilling tool into the facing panel. Once the desired depth of the drilled hole has been reached, the lever 35 is swung out using the connecting rod 44 by pulling back the handle 55. To limit the swinging-out action, the annular plate 48 has a screw 56 screwed into it, which projects with its end face into the slot 57.

As the lever is swung out, the peg 58 becomes disengaged from the recess 59 and at the same time is rotated so that the peg 58 engages the circumferential face 40 of the cam plate 49. By one rotation in its swung-out state the end of the lever 35 remote from the drilling tool is moved in a circle about its center line in the neutral position and at the same the undercut in the facing panel is reamed out using the drilling tool, which has also been swung out. After one rotation, the peg 58 snaps back into the recess 59, so that the lever 35 regains its neutral position. In this position the drilling tool is retracted from the drilled hole.

It will be understood that each of the elements described above, or two or more together, may also find a useful application in other types of constructions differing from the types described above.

While the invention has been illustrated and described as embodied in a device for producing a drilled hole with an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspect of this invention.

What is claimed is new and desired to be protected by Letters Patent is set forth in the appended claims, we claim:

1. In a device for making a drilled hole with an undercut consisting of a drilling machine having a drilling tool received in an adapter joined to the drilling machine so as to transfer torque to the drilling tool, a supporting stand for the drilling machine having a holding means, a bearing bush secured in the holding means, and a sleeve fixedly joined to said drilling machine, said sleeve being received and mounted in the bearing bush so as to rotate via a swivel bearing, the improvement comprising a lever (35) attached to the drilling machine (12), a cam plate (39,49) having a circumferential surface (40,60) attached to the supporting stand (3) and a crank, an end of the lever (35) remote from the drilling machine (12) being connected with the crank, the lever being arranged so that the lever can be pivoted and the drilling machine with the drilling tool swung out, said crank having at least one peg engagable on the circumferential face of the cam plate, said circumferential face acting as a stop for the lever so that the lever can be rotated when the peg engages on the circumferential surface so that the end of the lever remote from the drilling machine describes a circle about a center line of the lever when the lever is in a neutral position.

2. The improvement as defined in claim 1, wherein the cam plate (39,49) is provided with a recess (38,59) on the circumferential face (40,60) located and structured so that, when the lever (35) is in the neutral position, one of the pegs is received and locked therein.

3. The improvement as defined in claim 1, wherein the cam plate (39,49) has two recesses (38,59) and the crank is provided with two of said pegs(37a,37b), each of the pegs having a member (42) projecting at right angles therefrom and engaging behind a rear side of the cam plate (39).

4. The improvement as defined in claim 1, wherein the end of the lever (35) remote from the drilling machine is substantially ball-like and is engaged in a bore provided in the crank plate (31).

5. The improvement as defined in claim 1, wherein the crank is formed by an annular plate (48) positioned on the cam plate (49) and a connecting rod (44) connected to the lever (35) and guided in a transverse bore (47) provided in the annular plate (48).

6. The improvement as defined in claim 1, further comprising a compression spring (54) and centering sleeve (50) having a conical face (51) arranged on the lever (35) so that the centering sleeve (50) is pressed into a bore (53) of the cam plate (49) having a bevel (52) by the compression spring (54).

* * * * *